(12) United States Patent
Bertz et al.

(10) Patent No.: US 9,307,440 B1
(45) Date of Patent: Apr. 5, 2016

(54) PRIORITIZED DELIVERY FOR A COLLECTION OF CONTENT

(71) Applicant: Sprint Communications Company L.P., Overland Park, KS (US)

(72) Inventors: Lyle T. Bertz, Lee's Summit, MO (US); Trevor D. Shipley, Olathe, KS (US); Craig A. Sparks, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/704,835

(22) Filed: May 5, 2015

(51) Int. Cl.
*H04W 28/00* (2009.01)
*H04W 28/02* (2009.01)
*H04W 4/02* (2009.01)
*G06F 3/16* (2006.01)

(52) U.S. Cl.
CPC .......... *H04W 28/0226* (2013.01); *G06F 3/165* (2013.01); *H04W 4/027* (2013.01)

(58) Field of Classification Search
None
See application file for complete search history.

*Primary Examiner* — Diane Mizrahi

(57) ABSTRACT

A method of prioritizing delivery to a mobile device for an audio album through a wireless network. The method comprises dividing, by a server computer, the audio album into two groups based on historical statistics of playback probability of a plurality of tracks of the audio album to be played next after a track that is being played, wherein tracks with a higher probability than a predefined threshold are placed in an immediate playback group, group 1, wherein tracks with a lower probability than the predefined threshold are placed in a later playback group, group 2.

20 Claims, 9 Drawing Sheets

PRIORITIZED DELIVERY FOR A COLLECTION OF CONTENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Network capable electronic devices are becoming increasingly prevalent in our daily lives. Additionally, more and more electronic devices that did not have network capabilities are becoming network capable. With the rapid development and popularization of network capable electronic devices, a wide variety of digital content is becoming deliverable over the Internet within a short time period. For example, high end audio content can be delivered over the Internet from a server to electronic devices in shorter and shorter time periods.

SUMMARY

In an embodiment, a method of prioritizing delivery to a mobile device for an audio album through a wireless network is disclosed. The method comprises dividing, by a server computer, the audio album into groups based on historical statistics of playback probability of a plurality of tracks of the audio album to be played next after a track that is being played, wherein tracks with a higher probability than a predefined threshold are placed in an immediate playback group, group 1, wherein tracks with a lower probability than the predefined threshold are placed in a later playback group, group 2. The method further comprises further dividing group 1 and group 2 into two subgroups, 1A, 1B, 2A, and 2B based on resolution of tracks in either group, wherein 1A and 1B comprise different versions of same content, wherein 2A and 2B comprise different versions of same content, wherein 1A and 2A comprise low resolution version content and 1B and 2B comprise high resolution version content, and transmitting 1A within a period of time at a speed over the wireless network, wherein the speed is calculated based on predefined rules and the period of time is larger than a value of a dormancy timer. The method further comprises measuring an actual transmission speed during the time period, determining which subgroup of the second group to transmit first after 1A based on the measured actual transmission speed, and responsive to the actual transmission speed being large enough to deliver 2B in a timely manner, transmitting 2B.

In an embodiment, a method of prioritizing delivery to a mobile device for an audio album through a wireless network is disclosed. The method comprises dividing, by a server computer, the audio album into two groups based on historical statistics of playback probability of a plurality of tracks of the collection of content to be played next after a track that is being played, wherein tracks with a higher probability than a predefined threshold are placed in an immediate playback group, group 1, wherein tracks with a lower probability than the predefined threshold are placed in a later playback group, group 2. The method further comprises further dividing group 1 and group 2 into two subgroups, 1A, 1B, 2A, and 2B based on resolution of tracks in either group, wherein 1A and 1B comprise different versions of same content, wherein 2A and 2B comprise different versions of same content, wherein 1A and 2A comprise low resolution version content and 1B and 2B comprise high resolution version content, and estimating a transmission speed desired under current conditions to timely deliver group 2 over the network. The method further comprises transmitting 1A within a period of time at an initial speed over the wireless network, wherein the initial speed is determined based on the transmission speed desired to timely deliver group 2, monitoring a transmission speed of 1A, and adjusting content grouping of group 1 and group 2 dynamically based on the monitored transmission speed of 1A. The method further comprises determining which subgroup of the second group to transmit first after 1A based on a measured actual transmission speed for 1A after a transport layer of the wireless network finishes exponential window adjusting and switching between transmitting 2A and 2B dynamically based on a monitored transmission speed of the second group.

In an embodiment, a method of prioritizing delivery to a mobile device of a collection of content through a wireless network is disclosed. The method comprises dividing, by a server computer, the collection of content into two groups based on historical statistics of playback probability of a plurality of tracks of the collection of content to be played next after a track that is being played, wherein tracks with a higher probability than a predefined threshold are placed in an immediate playback group, group 1, wherein tracks with a lower probability than the predefined threshold are placed in a later playback group, group 2. The method further comprises further dividing group 1 and group 2 into two subgroups, 1A, 1B, 2A, and 2B based on resolution of tracks in either group, wherein 1A and 1B comprise different versions of same content, wherein 2A and 2B comprise different versions of same content, wherein 1A and 2A comprise low resolution version content and 1B and 2B comprise high resolution version content, and transmitting 1A within a period of time over the wireless network. The method further comprises measuring an actual transmission speed for 1A after a transport layer of the wireless network finishes exponential window adjusting during the period of time, determining which subgroup of the second group to first transmit after 1A based on the measured actual transmission speed, and responsive to the actual transmission speed being large enough to deliver 2B in a timely manner, transmitting 2B.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
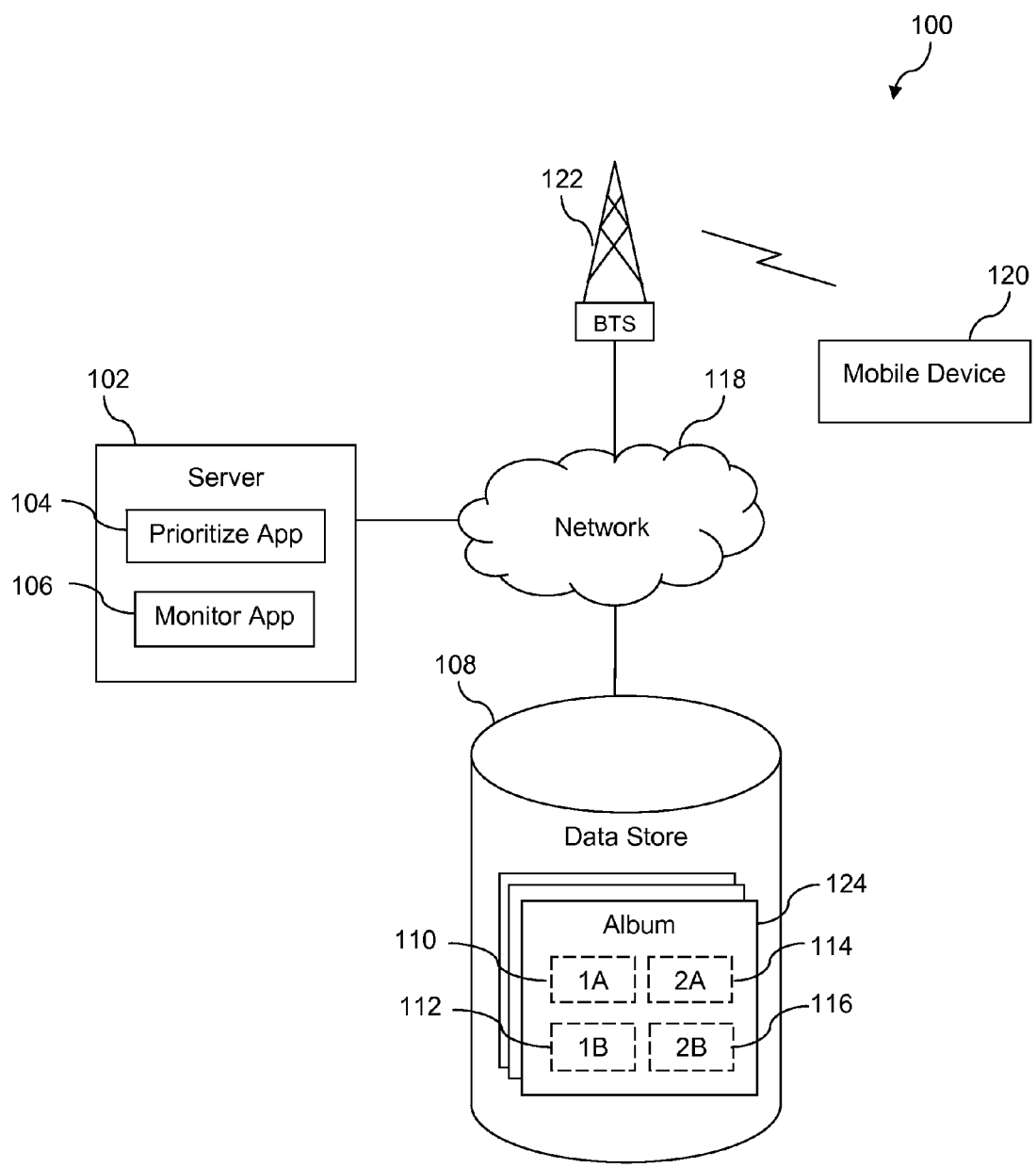
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Current audio delivering systems may electronically deliver audio content over the Internet and wireless network in a fixed order. For example, when a user of a mobile device requests to download a collection of audio content, for example an audio album, the audio delivery system may deliver the audio content in a fixed order. That is to say, the audio content may not be organized to be delivered in a desired order by the user. For example, when the user purchases the audio album or requests to download an audio album, the user may start to playback a favorite and/or popular track from the audio album immediately. The user may also wish to immediately playback other tracks of the album right after the first track. It may be challenging to deliver a whole collection of high resolution audio content immediately due to network bandwidth limitations, wireless network fluctuations (e.g., signal-to-noise ratio (SNR) at the mobile device), the size of the collection of high resolution audio content being large, and/or other limitations. However, it may be feasible to deliver low resolution version audio content for immediate playback and then deliver high resolution version audio content later when high resolution audio content is what the user actually purchased and so should be delivered eventually.

The present disclosure teaches a system and method for prioritizing delivery for a collection of content. For example, when a user purchases or requests to download a collection of content, for example a high resolution audio album, the user may wish to immediately playback a track from the album. The user may identify that track when purchasing the content. Alternatively, the track may be identified by consulting statistical data or audio popularity rating. A server computer that supports the audio delivery service or a prioritize application on the server computer may divide the audio album into two groups based on historical statistics of playback probability of the tracks of the audio album to be played next after the track that has been chosen to play. The prioritize application may be stored in a memory of the server computer and may be executed by a processor of the server computer. Tracks may be placed in an order from the largest probability to the least probability, where a track with the largest probability to be played next after the track being played is given the first place in line and/or the highest priority to be transmitted. A track with the least probability to be played next is given the last place in line and/or the lowest priority to be transmitted.

Tracks may be grouped into two groups based on the playback probabilities and/or the ordering. For example, tracks with a higher probability than a predefined threshold may be placed in an immediate playback group, group 1. The rest of the tracks of the album, or tracks with a lower probability than the predefined threshold may be placed in a later playback group, group 2. Tracks may also be grouped based on other rules. For example, a total size of tracks with higher playback probabilities exceeding a predefined size threshold may be grouped into group 1. As another example, a total number of tracks with higher playback probabilities exceeding a predefined number threshold may be grouped into group 1.

Group 1 and group 2 may each be further divided into two subgroups, subgroup 1A, subgroup 1B, subgroup 2A, and subgroup 2B based on resolution of tracks in each group. The content of subgroup 1A may be referred to more concisely as 1A, the content of subgroup 1B as 1B, the content of subgroup 2A as 2A, and the content of subgroup 2B as 2B. 1A and 1B may comprise different versions of same content while 2A and 2B may comprise different versions of same content. For example, 1A and 2A may comprise low resolution version content and 1B and 2B may comprise high resolution version content.

1A may be transmitted by the prioritize application at a speed within a period of time over a communication network to the mobile device, for example over a wireless network. The speed may be calculated and/or determined based on predefined rules. For example, delivery of 1A at the speed may be completed within 80% of playback duration of the current track. Alternatively, the speed may be a value that may deliver group 2 in a timely manner. "Timely delivery" or "timely transmission" of group 2 means that group 2 is delivered completely before playback of group 2. Similarly, "deliver group 2 in a timely manner" also means that group 2 is delivered completely before playback of group 2. Said in other words, timely delivery or delivery in a timely manner means the content is delivered before the user is anticipated to want to playback the subject content, for example because the user is playing back other content he or she already has, for example a more popular song in group 1. For example, the speed may be calculated based on a speed to timely deliver 2B, for example before 1A finishes playing. The period of time may be larger than a value of a dormancy timer, for example at least a sum of the dormancy timer and a predefined minimum value (e.g., 10 seconds). The dormancy timer may be a value set by a wireless communications service provider to minimize the duration for a channel to be reserved for transfer of packet data for a user. The period of time may also be set so that a transport layer of the wireless network enters a steady state after initial start of a network connection.

The transmission speed of 1A may be monitored by a monitor application. The monitor application may be stored in the memory of the server computer and may be executed by the processor of the server computer. The monitor application may communicate with the prioritize application to exchange information on transmission status of the album, for example a transmission speed of 1A. The prioritize application may adjust content grouping of group 1 and group 2 dynamically based on the monitored transmission speed of 1A. An actual transmission speed for 1A may be measured after the transport layer of the wireless network enters a steady state after initial start of a connection, for example after the transport layer finishes exponential window adjusting in the case of transmission control protocol (TCP) use. The prioritize application may determine which subgroup of group 2 to transmit first after complete delivery of 1A based on the measured actual transmission speed for 1A. For example, if the monitored transmission speed of 1A can support delivering all or most of 2B before playback of 1A completes, then 2B may be sent instead of 2A. If not, the smaller volume (because of lower resolution) of 2A is transmitted first.

The prioritize application may monitor transmission status of group 2, for example a transmission speed of group 2. After start transmitting group 2, the prioritize application may switch between transmitting 2A and 2B dynamically based on a monitored transmission speed of group 2. When the monitored transmission speed of group 2 is large enough to support transmission of 2B, the prioritize application may switch from transmitting 2A to transmitting 2B when 2A was being transmitted or may continue transmitting 2B when 2B was being transmitted. On the other hand, when the monitored transmission speed of group 2 is too low to support transmission of 2B, the prioritize app may switch from transmitting 2B to transmitting 2A when 2B was being transmitted or may continue transmitting 2A when 2A was being transmitted.

2B must eventually be transmitted. If high resolution tracks of 2B have been transmitted to the mobile device, the low resolution versions of 2A that correspond to tracks of 2B may not be transmitted. That is to say, transmitting 2A may be avoided when possible to reserve network resources. For example, when the network could support transmitting 2B, 2B may be transmitted and 2A may not be transmitted at all. Whenever the network may support timely transmitting 2B, the prioritize application 104 may transmit 2B instead of 2A. 1B may be transmitted after group 2 is completely transmitted—to deliver the high resolution content that the user purchased in the first place. For example, after 2B is completely transmitted, 1B may be transmitted. 1A and 2A tracks may be deleted by the prioritized application from the mobile device after 1B and 2B are delivered, for example within 24 hours of delivery of 1B and 2B. While downloading of audio content is used throughout as an example and preferred embodiment, it is understood that the teachings of the disclosure may be applied to downloading of other types of content.

Turning now to FIG. 1, a communication system 100 is described. In an embodiment, the communication system 100 comprises a plurality of mobile communication devices 120, a data store 108, and a server computer 102. The data store 108 may comprise a plurality of records of albums 124. An album 124 may comprise a collection of content. For example, each album 124 may comprise a plurality of audio tracks. An album 124 may be divided into two groups and then either group may further be divided into two subgroups based on predefined rules for delivery purposes. The division into two groups may be done dynamically in response to current, local network conditions. For example, for two different mobile devices 120, a first mobile device and a second mobile device, at different locations that request to download a same album 124, the same album 124 may be divided into two groups separately and the division may be different—the first group for the first mobile device may be different from the first group for the second mobile device and the second group for the first mobile device may be different from the second group for the second mobile device. The server 102 may comprise a prioritize application 104 and a monitor application 106. The mobile device 120 may be configured to use a radio transceiver to establish a wireless communication link with a base transceiver station (BTS) 122, and the base transceiver station 122 may communicatively couple the device 120 to a network 118. The server 102 and the data store 108 may also be coupled to the network 118. The network 118 may comprise any combination of private and public networks.

It is understood that the system 100 may comprise any number of mobile devices 120, any number of data stores 108, and any number of servers 102. The collectivity of base transceiver stations 122 may be said to comprise a radio access network, in that these base transceiver stations 122 may provide a radio communication link to the mobile devices 120 to provide access to the network 118. The radio transceiver of the mobile communication device 120 may communicate with the base transceiver station 122 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol.

The mobile device 120 may be any of a laptop computer, a notebook computer, a tablet computer, a mobile phone, a personal digital assistant (PDA), a media player, a headset computer, a wearable computer, a game console, an Internet digital media streaming device, a television, or another network/communications capable device. In an embodiment, the mobile communication device 120 may have other components (not shown) such as a near field communication (NFC) radio transceiver, a short range radio transceiver such as a wireless local area network radio transceiver, or other components.

The server 102 and the data store 108 may be server computers. The server 102 and the data store 108 may locate in one computer—for example a server computer, in two different computers—for example, a server computer for the server 102 and another computer for the data store 108, in multiple different computers—for example, multiple server computers for the server 102 and other multiple computers for the data store 108, or in some other combination of computers. When the server 102 and the data store 108 are not located in one computer, the trusted server 102 and the data store 108 may share the same wired or wireless local area network. The server 102 may manage and/or manipulate data stored in the data store 108.

The monitor application 106 may be stored in a memory of the server 102. When executed by a processor of the server 102, the monitor application 106 may perform a variety of functionality to monitor data transmitting activities. For example, the monitor app 106 may copy packet captures of album transmitting traffic to a memory of the server 102 and analyze the packet captures. For example, the monitor app 106 may fetch packet captures for the album transmitting from a network sniffer/packet capturing tool, such as Wireshark, tcpdump, or another network sniffer/packet capturing tool, and move the packet captures to the memory of the server 102 for further analysis. The monitor application 106 may communicate with the prioritize application 104 to exchange information on monitored album transmission status. For example, the monitor application 106 may send messages and/or notifications to the prioritize application 104, for example providing monitored status of the album transmitting. In an embodiment, the monitor app 106 persistently captures outgoing packets of album transmitting and periodically analyzes network traffic of the album transmitting, for example to determine a transmission rate or speed of the subject content over the network 118, through the BTS 122, to the mobile device 120. When the rate of album transmitting is calculated by the monitor app 106 during the periodic analysis, a message and/or notification may be transmitted by the monitor app 106 to the prioritize application 104.

The prioritize application 104 may be stored in the memory of the server 102. When executed by the processor of the server 102, the prioritize application 104 may perform a variety of functionality to prioritize delivering of a collection of content, for example an album 124. The album 124 may be an audio album, a collection of audio tracks of a radio station, or the like. For example, the prioritize application 104 may divide or group the album 124 into a variety of sections. The prioritize app 104 may monitor album 124 transmission status and adjust grouping of the album 124 based on the monitored transmission status. The prioritize 104 may determine which section to transmit first and may switch between transmission of different sections.

For example, the prioritize application 104 may divide the audio album 124 into two groups based on historical statistics of playback probability of tracks of the audio album 124 to be played next after a track currently being played, as discussed earlier. Usage statistics from a piece of online music player software, for example Spotify, may be utilized to obtain the playback probability. For example, some tracks in an album 124 may be more likely to be played next after a specific track than other tracks in the same album 124 and this data may be obtained from Spotify.

For example, when a user of a mobile device 120 requests to download an album 124, the user may start playing a track from the album 124 immediately. The prioritize application 104 may sort tracks of the album 124 based on historical statistics of playback probability of the tracks to be played next after the track that is being played. For example, the prioritize app 104 may place the tracks of the album 124 in an order where a track with the highest playback probability next after the track being played is placed in the first place in line and/or with a highest priority. Accordingly, a track with the lowest playback probability to be played next after the track being played is placed in the last place in line and/or with a lowest priority.

The prioritize application 104 may divide the album 124 into two groups based on the probabilities and/or order. "Placing tracks in groups or subgroups" is an abstraction and does not mean the album is being reformatted. It is an abstraction used to select and transmit tracks in a preferred order. For example, tracks with higher probabilities to be played next after the track being played than a predefined probability threshold may be placed by the prioritize application 104 in an immediate playback group, group 1; the rest of the tracks in the album 124, or tracks with lower probabilities to be played next after the track being played than the predefined probability threshold may be placed in a later playback group, group 2.

Alternatively, tracks with higher probabilities to be played next after the track being played may be placed in group 1 based on a total size (e.g., kilobytes or megabytes of content in a track) of tracks in group 1 being larger than a predefined size threshold and the rest of the tracks of album 124 may be placed in group 2. For example, a size sum may be calculated from the first place in line of the tracks. The size sum may be compared to the predefined size threshold each time after a new track size is added to the sum. When the size sum is smaller than the predefined size threshold, the summation continues and the size of the next track in line may be added to the size sum. When the size sum is larger than the predefined size threshold, the summation may stop and the tracks that have been used for the size sum so far may be grouped into group 1. A third method of dividing the album 124 into two groups may place tracks with higher probabilities to be played next after the track being played in group 1 based on a total number of tracks in group 1 being larger than a predefined number threshold and the rest of the tracks of album 124 may be placed in group 2.

The prioritize application 104 may further divide each of the two groups into two content subgroups based on a resolution of the tracks in each subgroup. For example, the prioritize application 104 may further divide each of group 1 and group 2 into two subgroups, subgroup 1A 110, subgroup 1B 112, subgroup 2A 114, and subgroup 2B 116, for example based on resolution or bit rate of tracks in each subgroup. In an embodiment, album 124 may comprise different versions of a track, for example a high resolution version and a low resolution version. Group 1 may comprise different versions of the same track and may be divided into two subgroups, 1A 110 and 1B 112, based on resolution of the tracks in group 1. 1A 110 and 1B 112 may comprise different versions of the same tracks: 1A 110 may comprise low resolution versions (e.g., 96 kbits/s) and 1B 112 may comprise high resolution versions (e.g., 320 kbits/s) of the same tracks. Similarly, group 2 may comprise different versions of the same tracks and may be divided into two subgroups, 2A 114 and 2B 116, based on resolution of the tracks in group 2. 2A 114 and 2B 114 may comprise different versions of the same tracks: 2A 114 may comprise low resolution versions and 2B 116 may comprise high resolution versions.

The prioritize application 104 may transmit 1A 110 within a period of time at a speed over a communication network, for example over a wireless network. For example, the prioritize application 104 may transmit a message and/or request to a message transmitting application on the server 102 to transmit 1A 110. The message and/or request may comprise details on how to transmit 1A 110, for example the speed, duration, or another type of transmission detail. The speed may be calculated based on predefined rules. In an embodiment, the speed is calculated by dividing the size of 1A 110 by a specific percentage of duration of the current track being played (e.g., 80%). That is to say, the speed may be calculated so that 1A 110 may be transmitted at that speed and the transmission may be complete before the current track finishes playing. Alternatively, the prioritize application 104 may calculate and/or estimate a second speed needed to timely transmit group 2 over the network and may then transmit 1A 110 at the second speed within a period of time. Whether or not 1A 110 can be delivered with the second speed may be used to determine whether 2B may be delivered without delivering 2A. For example, when 1A is able to be delivered with an average speed at least equal to the second speed, the prioritize application 104 may decide to transmit 2B after delivering 1A. On the other hand, when 1A is unable to be delivered with an average speed at least equal to the second speed, the prioritize application 104 may decide to transmit 2A first after delivering 1A. The period of time may be larger than a value of a dormancy timer. For example, the period of time may be at least the sum of a dormancy timer and a predefined minimum value (e.g., 10 seconds).

The prioritize application 104 may monitor a transmission status of 1A 110, for example a transmission speed of 1A 110. For example, the prioritize application 104 may periodically transmit a request to the monitor app 106 for the transmission status of 1A 110. Alternatively, the monitor app 106 may transmit a message and/or notification to the prioritize app 104 when the monitor app 106 analyzes the transmission status of 1A 110 and/or calculates a transmission speed of 1A 110. The prioritize application 104 may adjust content grouping of group 1 and group 2 dynamically based on the monitored transmission speed of 1A 110. For example, the prioritize app 104 may move content from group 2 to group 1 for speed measurement purposes when the monitored transmission speed of 1A 110 is fluctuating too much and a transport layer of the network takes longer than expected to enter a steady state after initial start of a connection.

The prioritize application 104 may determine which subgroup of group 2, 2A 114 or 2B 116, to transmit first after 1A 110 is completely delivered based on a variety of factors. For example, the prioritize application 104 may determine which subgroup of group 2, 2A 114 or 2B 116, to transmit first after 1A 110 is completely delivered based on the measured actual transmission speed for 1A 110. The actual transmission speed of 1A 110 may be measured after the transport layer of the wireless network enters the steady state, for example after finishing exponential window adjusting in case of transmission control protocol (TCP). For example, 1A 110 may be transmitted within 30 seconds and the actual transmission speed of 1A 110 in the last 15 seconds of the 30 seconds may be utilized for determination of which subgroup of group 2 to transmit first since the transport layer enters the steady state after the first 15 seconds. With the measured actual transmission speed of 1A 110 in the steady state, the prioritize application 104 may determine which of the subgroups of group 2 to transmit first.

The prioritize application 104 may determine which subgroup of group 2 to first transmit after 1A 110 is completely delivered based on a location of the mobile device 120. For example, when location data of the mobile device 120 indicates that the mobile device 120 is in an urban area with sufficient network resources and the network may support transmitting 2B 116, the prioritize app 104 may determine to transmit 2B 116 after 1A 110 is finished. On the other hand, when location data of the mobile device 120 indicates that the mobile device 120 is in a rural area with insufficient network resources and the network may not support transmitting 2B 116 timely, the prioritize app 104 may determine to transmit 2A 114 first after 1A 110. 2B 116 may be transmitted later on, for example after 2A 114 is completely delivered or after part of 2A 114 is delivered. The prioritized application 104 may determine which subgroup of group 2 to transmit first based on a moving speed and direction of the mobile device 120. For example, when the mobile device 120 is detected to be moving toward an area with insufficient network resources and the network may not support transmitting 2B 116 timely, the prioritized application 104 may determine to transmit 2A 114 after 1A 110. The prioritize application 104 may determine which subgroup of group 2 to first transmit based on the time of the day when a request to deliver the audio album 124 is submitted by the mobile device 120. For example, when the mobile device 120 is about to finish downloading 1A 110 and it is during peak hours of the day for network data consumption, the prioritize app 104 may determine to transmit 2A 114 after 1A 110. Alternatively, the prioritize application 104 may determine which subgroup of group 2 to first transmit based historical success probabilities of transmitting high resolution version content at a higher speed than the transmission speed of 1A 110 to the mobile device 120.

The prioritized application 104 may switch between transmitting 2A 114 and 2B 116 dynamically based on a monitored transmission speed of group 2. For example, similar to how the prioritize application 104 monitors transmission status of 1A 110, the prioritize application 104 may monitor the transmission status of group 2. When the monitored transmission speed of group 2 is large enough to support timely transmission of 2B 116, the prioritize app 104 may switch from transmitting 2A 114 to transmitting 2B 116 when 2A 114 was being transmitted or may continue transmitting 2B 116 when 2B 116 was being transmitted. On the other hand, when the monitored transmission speed of group 2 is too low to support timely transmission of 2B 116, the prioritize app 104 may switch from transmitting 2B 116 to transmitting 2A 114 when 2B 116 was being transmitted or may continue transmitting 2A 114 when 2A 114 was being transmitted.

Transmitting 2A 114 may be avoided when possible to reserve network resources. For example, when the network could support transmitting 2B 116 timely, 2B 116 may be transmitted and 2A 114 may not be transmitted at all. Whenever the network may support transmitting 2B 116 timely, the prioritize application 104 may transmit 2B 116 instead of 2A 114. 1B 112 may be transmitted after group 2 is completely transmitted. For example, after 2B 116 is completely transmitted, 1B 112 may be transmitted. 1A 110 and 2A 114 tracks may be deleted by the prioritized application 104 from the mobile device 102 after 1B 112 and 2B 116 are delivered, for example within 24 hours of delivery of 1B 112 and 2B 116.

Figure 2:
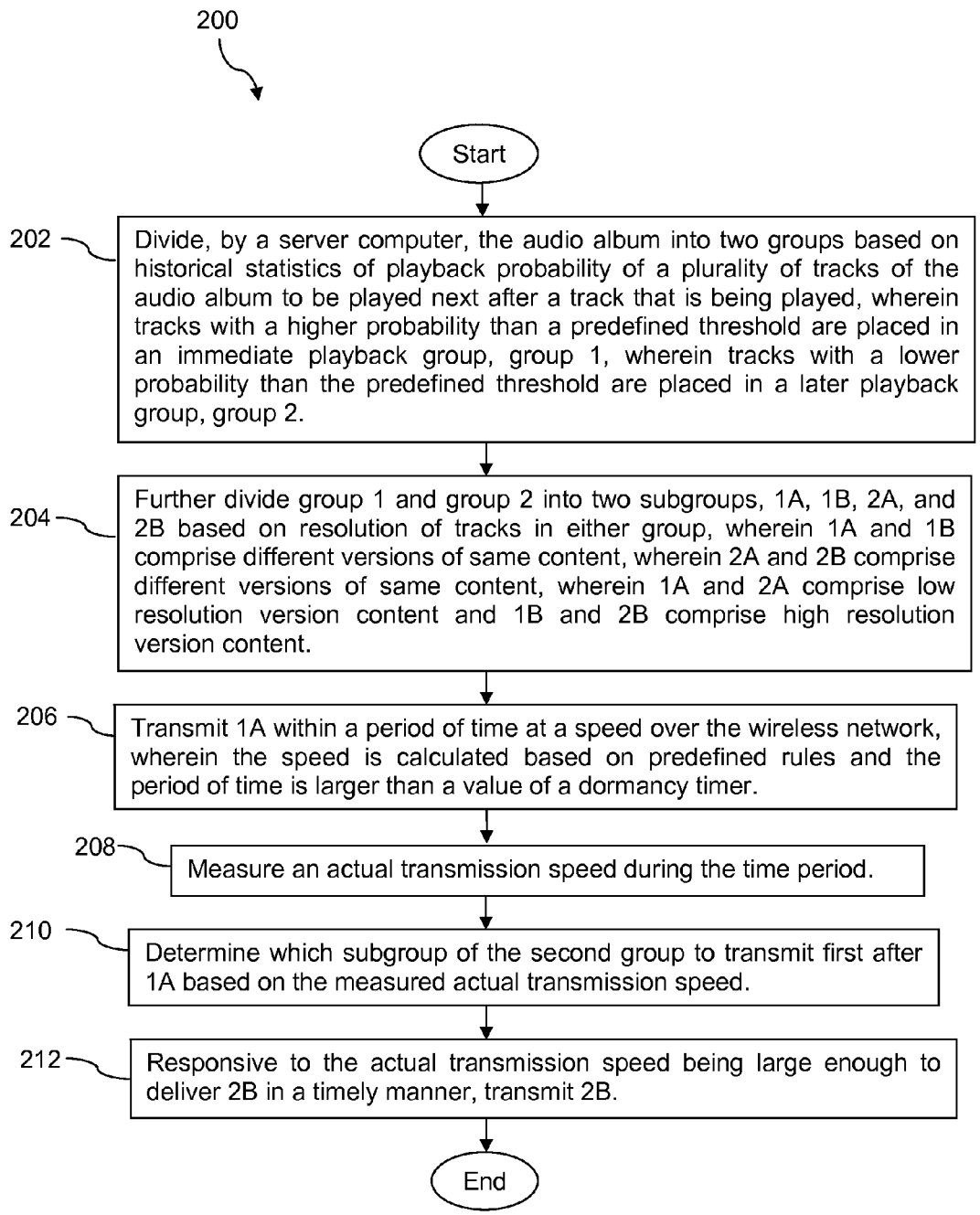
FIG. 2 is a flow chart illustrating a method according to an embodiment of the disclosure.

Turning now to FIG. 2, a method 200 is described. At block 202, the audio album is divided by a server computer into two groups based on historical statistics of playback probability of a plurality of tracks of the audio album to be played next after a track that is being played, wherein tracks with a higher probability than a predefined threshold are placed in an immediate playback group, group 1, wherein tracks with a lower probability than the predefined threshold are placed in a later playback group, group 2. For example, tracks of an audio album 124 may be divided by the server computer 102 or an application on the server 102, for example the prioritize application 104, based on historical statistics of playback probability of the tracks to be played next after the track that is being played. Tracks with a higher probability than a predefined threshold may be placed in an immediate playback group, group 1 while the rest of the tracks in the album 124, with a lower probability than the predefined threshold, may be placed in a later playback group, group 2.

At block 204, group 1 and group 2 are further divided into two subgroups, 1A, 1B, 2A, and 2B based on resolution of tracks in either group, wherein 1A 110 and 1B 112 comprise different versions of same content, wherein 2A 114 and 2B 116 comprise different versions of same content, wherein 1A 110 and 2A 114 comprise low resolution version content and 1B 112 and 2B 116 comprise high resolution version content. It should be noted that this division may be done in advance, for example before dividing the album 124 into group 1 and group 2 or even before the request to download the album 124 since different versions of the same tracks in the album 124 may be divided into a high resolution version group and a low resolution version group based on resolution of the tracks in the album 124. At block 206, 1A is transmitted within a period of time at a speed over the wireless network, wherein the speed is calculated based on predefined rules and the period of time is larger than a value of a dormancy timer. For example, 1A may be transmitted by the prioritize application 104 within a period of time at a speed over the wireless network. The speed at which 1A 110 may be transmitted may be calculated based on predefined rules, for example a speed large enough to timely transmit 1A 110 before the current track finishes playing. The period of time to transmit 1A 110 at the speed may be larger than the value of a dormancy timer.

At block 208, an actual transmission speed is measured during the time period. For example, an actual transmission speed for 1A 110 may be measured during the time period after a transport layer of the network enters a steady state. At block 210, which subgroup of the second group to transmit first after 1A 110 is determined based on the measured actual transmission speed. At block 212, responsive to the actual transmission speed being large enough to deliver 2B 116 in a timely manner, 2B 116 is transmitted.

Figure 3A:
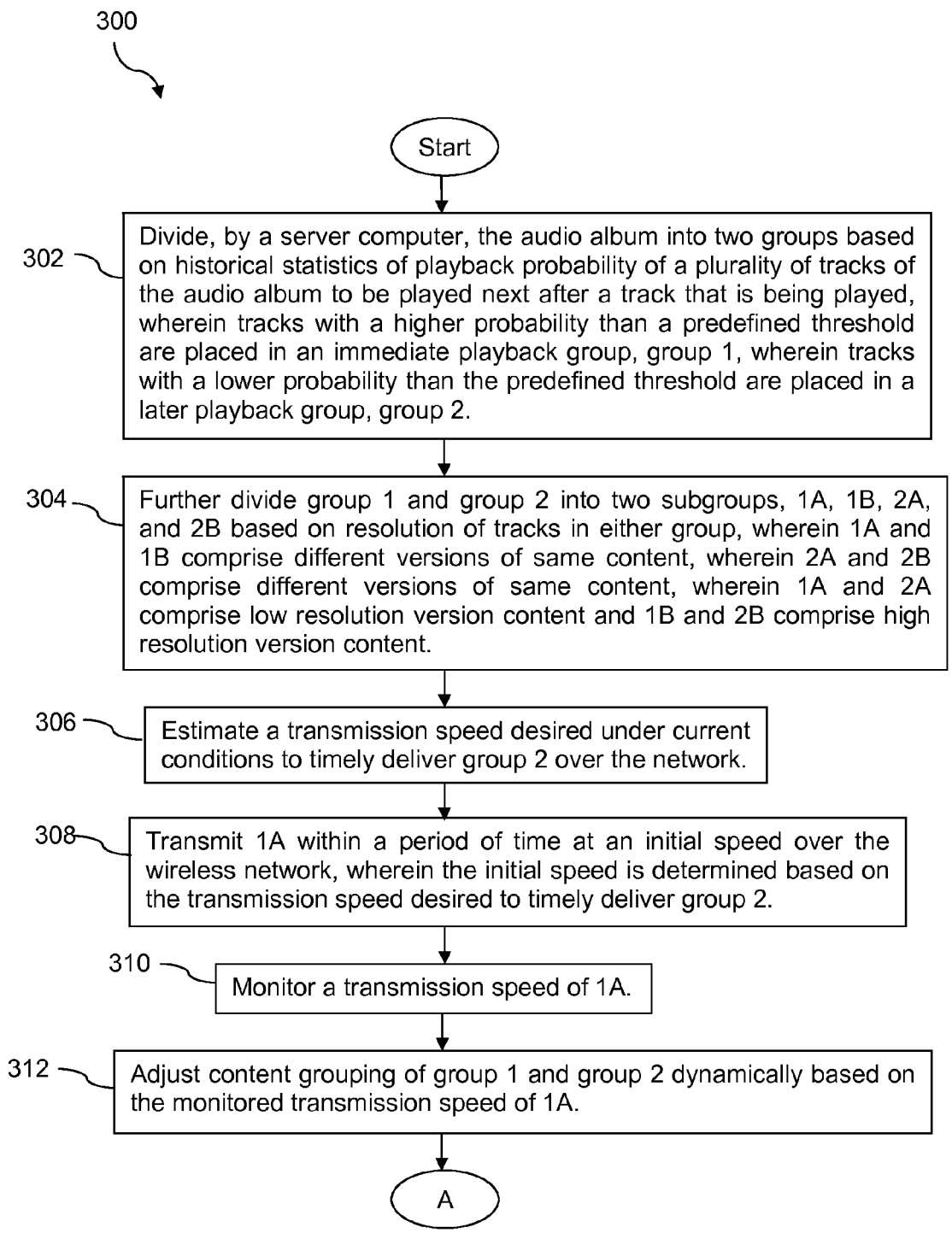
FIG. 3A and FIG. 3B is a flow chart illustrating another method according to an embodiment of the disclosure.
Figure 3B:
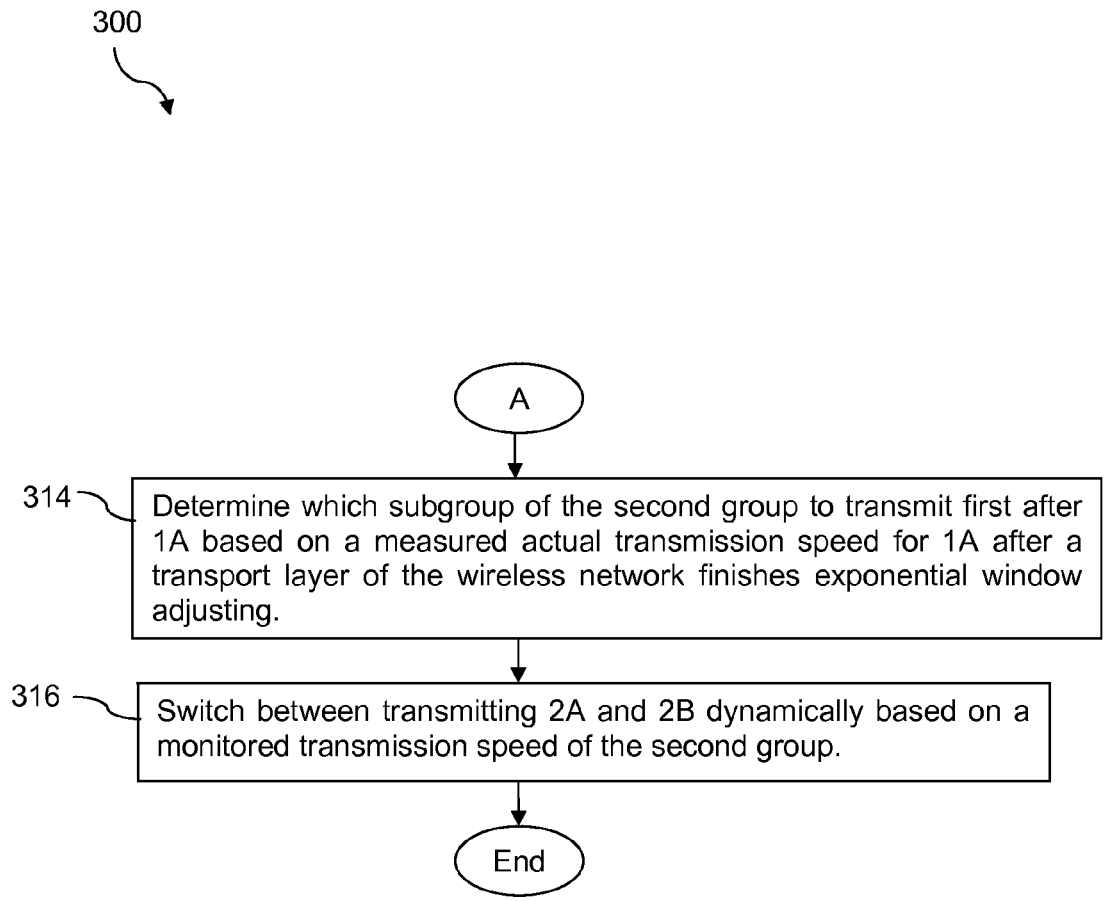

Turning now to FIG. 3, a method 300 is described. At block 302, the audio album 124 is divided by a server computer into two groups based on historical statistics of playback probability of a plurality of tracks of the audio album 124 to be played next after a track that is being played, wherein tracks with a higher probability than a predefined threshold are placed in an immediate playback group, group 1, wherein tracks with a lower probability than the predefined threshold are placed in a later playback group, group 2.

At block 304, group 1 and group 2 are further divided into two subgroups, 1A 110, 1B 112, 2A 114, and 2B 116 based on resolution of tracks in either group, wherein 1A 110 and 1B 112 comprise different versions of same content, wherein 2A 114 and 2B 116 comprise different versions of same content, wherein 1A 110 and 2A 114 comprise low resolution version content and 1B 112 and 2B 116 comprise high resolution version content. At block 306, a transmission speed desired under current conditions to timely deliver group 2 over the network is estimated.

At block 308, 1A 110 is transmitted within a period of time at an initial speed over the wireless network, wherein the initial speed is determined based on the transmission speed desired to timely deliver group 2. At block 310, a transmission speed of 1A 110 is monitored. At block 312, content grouping of group 1 and group 2 is adjusted dynamically based on the monitored transmission speed of 1A 110. At block 314, which subgroup of the second group to transmit first after 1A 110 is determined based on a measured actual transmission speed for 1A 110 after a transport layer of the wireless network finishes exponential window adjusting. At block 316, it is switched between transmitting 2A 114 and 2B 116 dynamically based on a monitored transmission speed of the second group.

Figure 4:
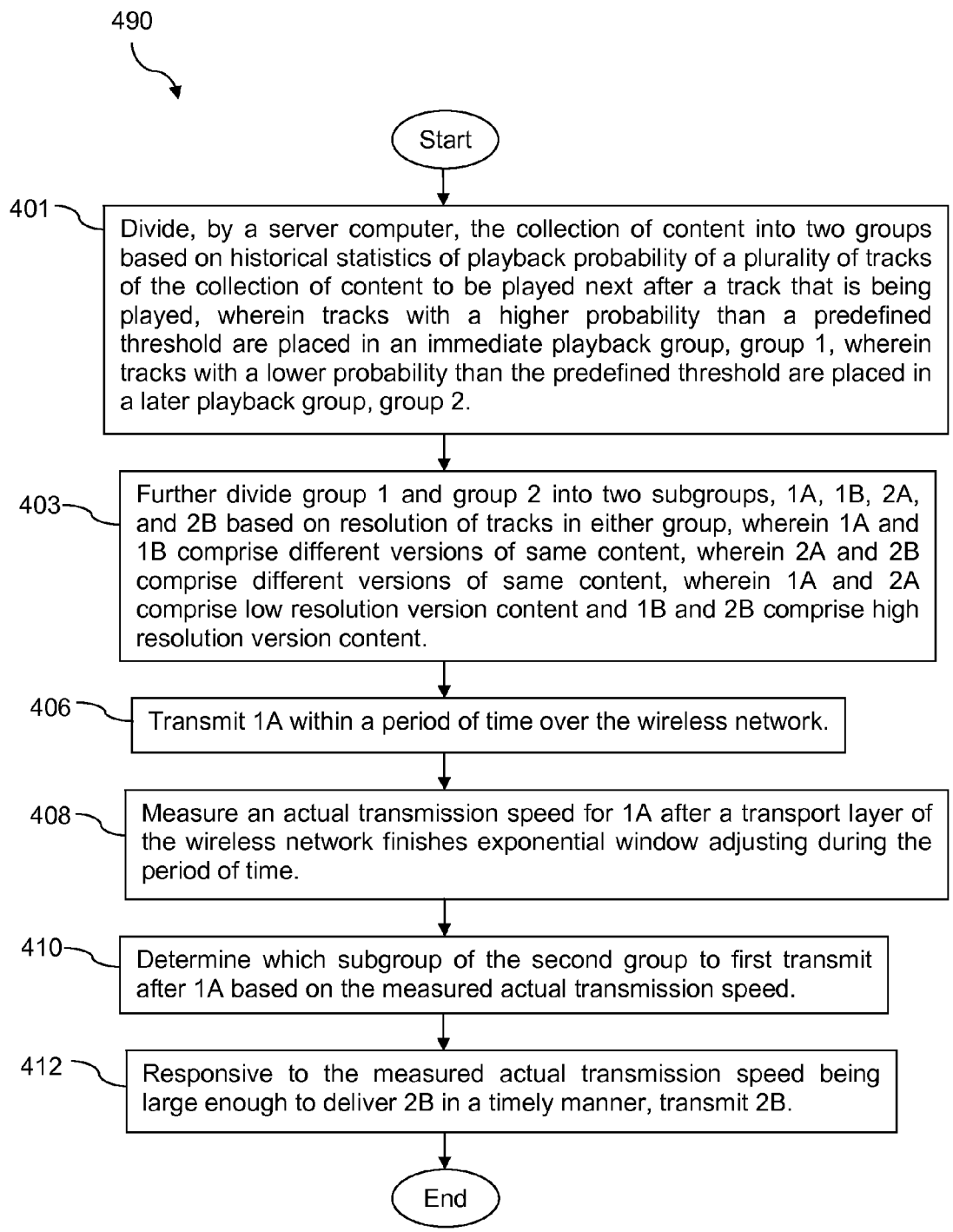
FIG. 4 is a flow chart illustrating a third method according to an embodiment of the disclosure.

Turning now to FIG. 4, a method 490 is described. At block 401, the collection of content is divided by a server computer 102 into two groups based on historical statistics of playback probability of a plurality of tracks of the collection of content to be played next after a track that is being played, wherein tracks with a higher probability than a predefined threshold are placed in an immediate playback group, group 1, wherein tracks with a lower probability than the predefined threshold are placed in a later playback group, group 2.

At block 403, group 1 and group 2 are further divided into two subgroups, 1A 110, 1B 112, 2A 114, and 2B 116 based on resolution of tracks in either group, wherein 1A 110 and 1B 112 comprise different versions of same content, wherein 2A 114 and 2B 116 comprise different versions of same content, wherein 1A 110 and 2A 114 comprise low resolution version content and 1B 112 and 2B 116 comprise high resolution version content. At block 406, 1A 110 is transmitted within a period of time over the wireless network. At block 408, an actual transmission speed is measured for 1A 110 after a transport layer of the wireless network finishes exponential window adjusting during the period of time. At block 410, which subgroup of the second group to first transmit after 1A 110 is determined based on the measured actual transmission speed. At block 412, responsive to the measured actual transmission speed being large enough to deliver 2B 116 in a timely manner, 2B 116 is transmitted.

Figure 5:
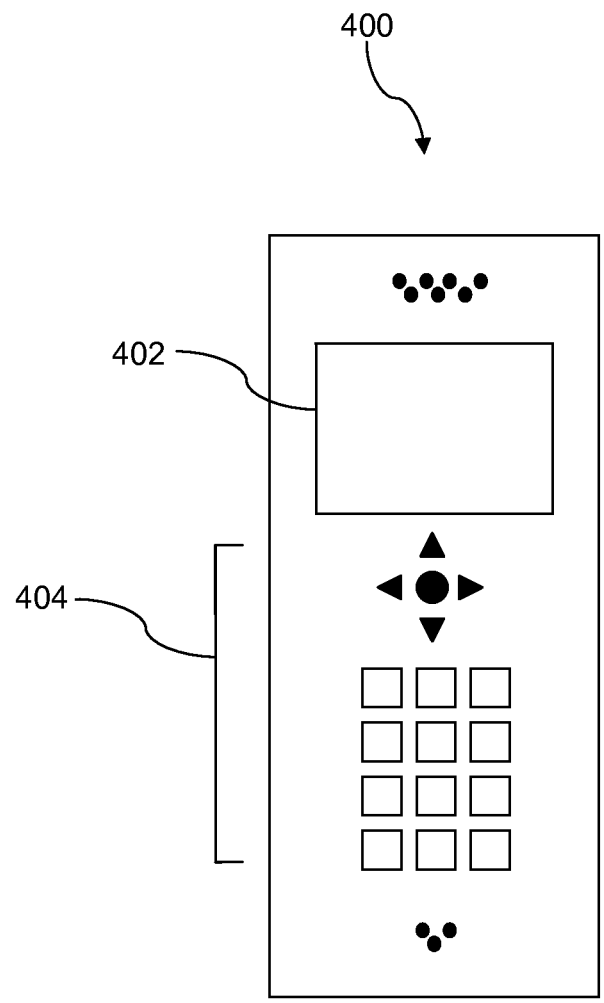
FIG. 5 is an illustration of a mobile communication device according to an embodiment of the disclosure.

FIG. 5 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 6:
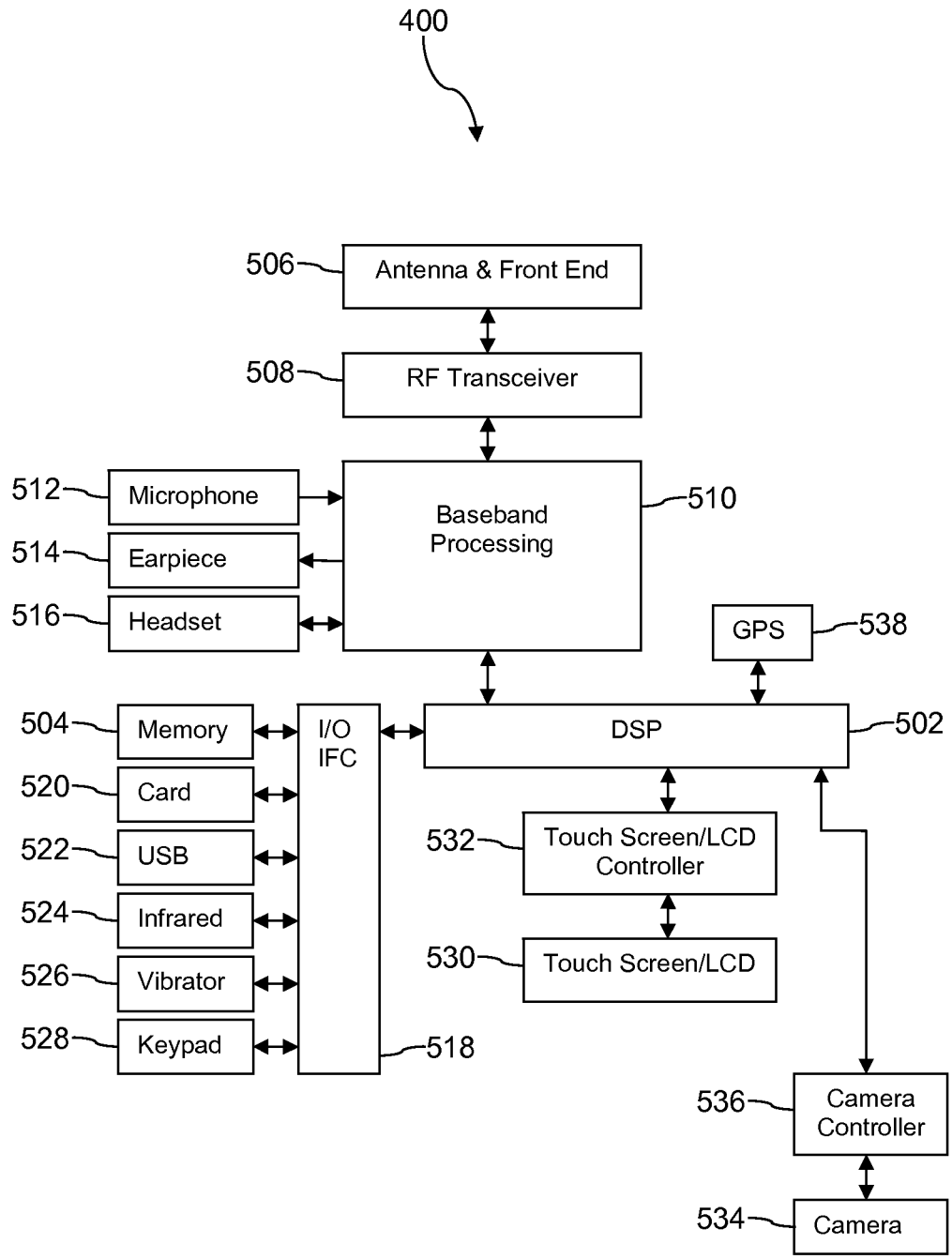
FIG. 6 is a block diagram of a mobile communication device according to an embodiment of the disclosure.

FIG. 6 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations. In an embodiment, the device 400 may comprise a near field communication (NFC) transceiver. The NFC transceiver may be used to complete payment transactions with point-of-sale terminals or other communications exchanges. In an embodiment, the device 400 may comprise a radio frequency identify (RFID) reader and/or writer device.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 7A:
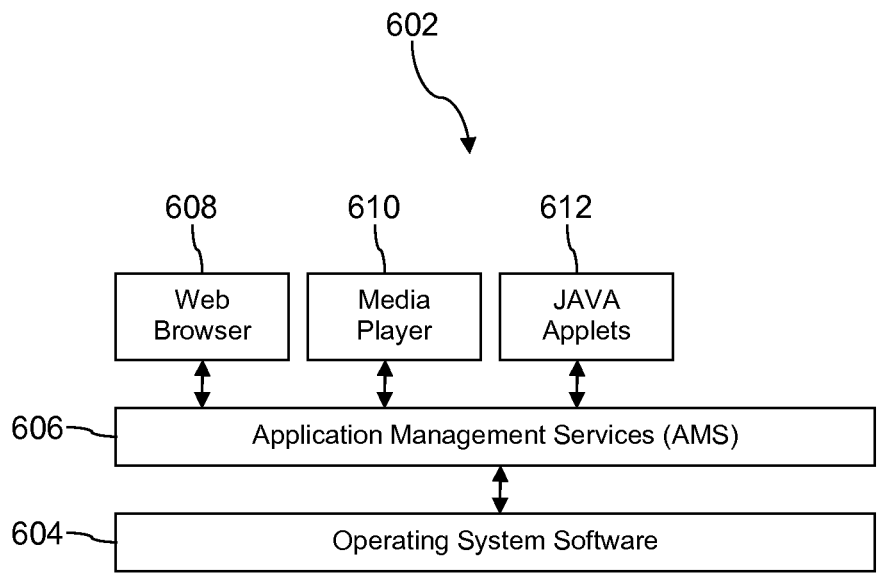
FIG. 7A is a block diagram of a software architecture of a mobile communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 7A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 7B:
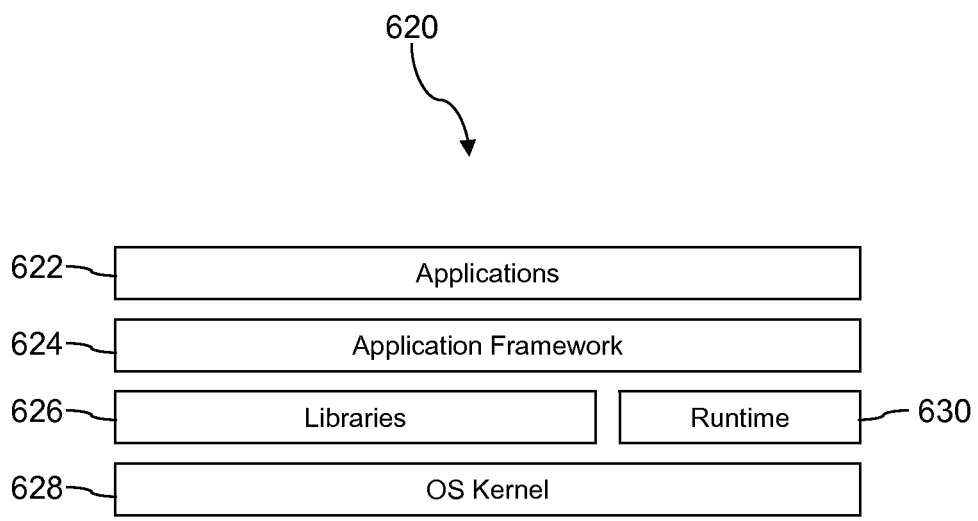
FIG. 7B is a block diagram of another software architecture of a mobile communication device according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
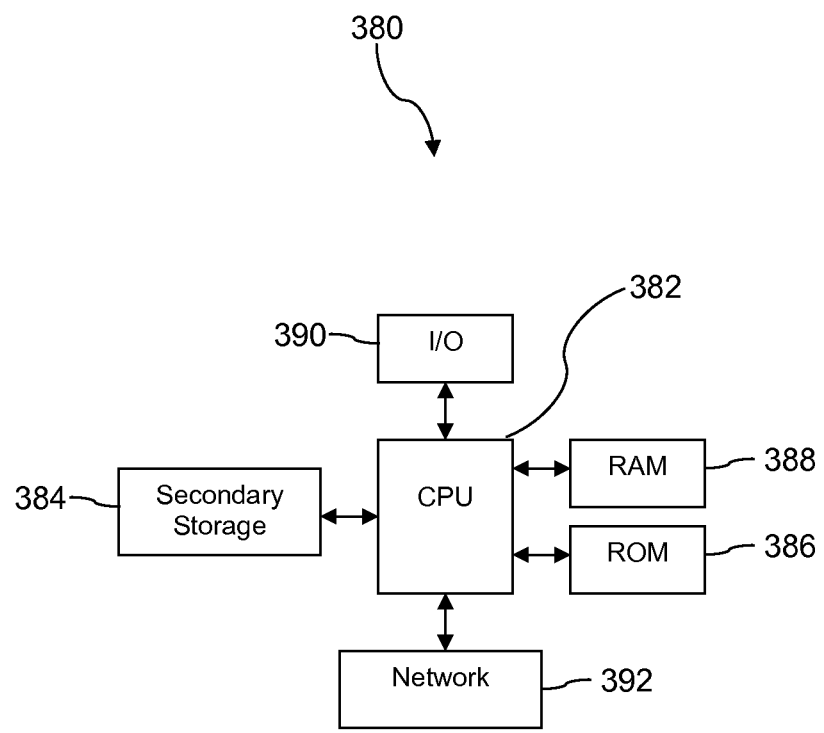
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/ or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of prioritizing delivery to a mobile device for an audio album through a wireless network, comprising:
   dividing, by a server computer, the audio album into two groups based on historical statistics of playback probability of a plurality of tracks of the audio album to be played next after a track that is being played, wherein tracks with a higher probability than a predefined threshold are placed in an immediate playback group, group 1, wherein tracks with a lower probability than the predefined threshold are placed in a later playback group, group 2;
   further dividing group 1 and group 2 into two subgroups, 1A, 1B, 2A, and 2B based on resolution of tracks in either group, wherein 1A and 1B comprise different versions of same content, wherein 2A and 2B comprise different versions of same content, wherein 1A and 2A comprise low resolution version content and 1B and 2B comprise high resolution version content;
   transmitting 1A within a period of time at a speed over the wireless network, wherein the speed is calculated based on predefined rules and the period of time is larger than a value of a dormancy timer;
   measuring an actual transmission speed during the time period;
   determining which subgroup of the second group to transmit first after 1A based on the measured actual transmission speed; and
   responsive to the actual transmission speed being large enough to deliver 2B before playback of 2B, transmitting 2B.

2. The method of claim 1, wherein the period of time is at least a total value of the dormancy timer and a predefined minimum value.

3. The method of claim 1, wherein the plurality of tracks are placed in an order where a track with the largest probability to be played is given the highest priority to be transmitted before grouped into two groups.

4. The method of claim 1, further comprising, monitoring a transmission speed of 1A.

5. The method of claim 4, further comprising, adjusting content grouping of group 1 and group 2 dynamically based on the monitored transmission speed of 1A.

6. The method of claim 5, further comprising, switching between transmitting 2A and 2B dynamically based on a monitored transmission speed of group 2.

7. The method of claim 1, wherein 1A and 2A tracks are deleted from the mobile device after 1B and 2B are delivered.

8. A method of prioritizing delivery to a mobile device for an audio album through a wireless network, comprising:
   dividing, by a server computer, the audio album into two groups based on historical statistics of playback probability of a plurality of tracks of the audio album to be played next after a track that is being played, wherein tracks with a higher probability than a predefined threshold are placed in an immediate playback group, group 1, wherein tracks with a lower probability than the predefined threshold are placed in a later playback group, group 2;
   further dividing group 1 and group 2 into two subgroups, 1A, 1B, 2A, and 2B based on resolution of tracks in either group, wherein 1A and 1B comprise different versions of same content, wherein 2A and 2B comprise different versions of same content, wherein 1A and 2A comprise low resolution version content and 1B and 2B comprise high resolution version content;
   estimating a transmission speed desired under current conditions to deliver group 2 over the network before playback of group 2;
   transmitting 1A within a period of time at an initial speed over the wireless network, wherein the initial speed is determined based on the transmission speed desired to deliver group 2 before playback of group 2;
   monitoring a transmission speed of 1A;
   adjusting content grouping of group 1 and group 2 dynamically based on the monitored transmission speed of 1A;
   determining which subgroup of the second group to transmit first after 1A based on a measured actual transmission speed for 1A after a transport layer of the wireless network finishes exponential window adjusting; and
   switching between transmitting 2A and 2B dynamically based on a monitored transmission speed of the second group.

9. The method of claim 1, further comprising, determining which subgroup of the second group to transmit first based on historical success probabilities of transmitting high resolution version content at a higher speed than 1A to the mobile device.

10. The method of claim 1, further comprising, determining which subgroup of the second group to transmit first based on a location of the mobile device.

11. The method of claim 1, further comprising, determining which subgroup of the second group to transmit first based on a moving speed and direction of the mobile device.

12. The method of claim 1, further comprising, determining which subgroup of the second group to transmit first based on time of the day when a request to deliver the audio album is submitted by the mobile device.

13. The method of claim 8, wherein the mobile device is one of a laptop computer, a notebook computer, a tablet computer, a mobile phone, a personal digital assistant (PDA), a media player, a headset computer, a wearable computer, a game console, an Internet digital media streaming device, a television, or another network/communications capable device.

14. The method of claim 8, wherein the mobile device establishes a wireless communication with a radio access network according to a code division multiple access (CDMA) wireless communication protocol, a global system for mobile communication (GSM) wireless communication protocol, a long-term evolution (LTE) wireless communication protocol, or a world-wide interoperability for microwave access (WiMAX) wireless communication protocol.

15. A method of prioritizing delivery to a mobile device of a collection of content through a wireless network, comprising:

dividing, by a server computer, the collection of content into two groups based on historical statistics of playback probability of a plurality of album tracks of the collection of content to be played next after a track that is being played, wherein album tracks with a higher probability than a predefined threshold are placed in an immediate playback group, group 1, wherein album tracks with a lower probability than the predefined threshold are placed in a later playback group, group 2;

further dividing group 1 and group 2 into two subgroups, 1A, 1B, 2A, and 2B based on resolution of album tracks in either group, wherein 1A and 1B comprise different versions of same content, wherein 2A and 2B comprise different versions of same content, wherein 1A and 2A comprise low resolution version content and 1B and 2B comprise high resolution version content;

transmitting 1A within a period of time over the wireless network;

measuring an actual transmission speed for 1A after a transport layer of the wireless network finishes exponential window adjusting during the period of time;

determining which subgroup of the second group to first transmit after 1A based on the measured actual transmission speed; and responsive to the measured actual transmission speed being large enough to deliver 2B before playback of 2B, transmitting 2B.

16. The method of claim 15, further comprising, monitoring a transmission speed of 1A.

17. The method of claim 16, further comprising, adjusting content grouping of group 1 and group 2 dynamically based on the monitored transmission speed of 1A.

18. The method of claim 17, further comprising, switching between transmitting 2A and 2B dynamically based on a monitored transmission speed of group 2.

19. The method of claim 15, wherein 1B is downloaded after group 2 is downloaded.

20. The method of claim 15, wherein downloading 2A is avoided when possible to reserve network resources.

* * * * *